(12) United States Patent
Parthasarathy et al.

(10) Patent No.: US 11,262,990 B2
(45) Date of Patent: Mar. 1, 2022

(54) APPLICATION TOPOLOGY DISCOVERY

(71) Applicant: International Business Machines Corporation, Armonk, NY (US)

(72) Inventors: Srinivasan Parthasarathy, White Plains, NY (US); Jinho Hwang, Ossining, NY (US); Qing Wang, Chappaqua, NY (US); Larisa Shwartz, Greenwich, CT (US); Michael Elton Nidd, Zurich (CH); Frank Bagehorn, Dottikon (CH); Jakub Krchák, Jindrichuv Hradec (CZ); Altynbek Orumbayev, Prague (CZ); Michal Mýlek, Vrane nad Vltavou (CZ); Ota Sandr, Prague (CZ); Tomáš Ondrej, Prague (CZ)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 16/882,811

(22) Filed: May 26, 2020

(65) Prior Publication Data

US 2021/0373861 A1  Dec. 2, 2021

(51) Int. Cl.
*G06F 9/44* (2018.01)
*G06F 8/41* (2018.01)
(Continued)

(52) U.S. Cl.
CPC .............. *G06F 8/433* (2013.01); *G06F 8/75* (2013.01); *G06F 16/245* (2019.01)

(58) Field of Classification Search
None
See application file for complete search history.

(56) References Cited

U.S. PATENT DOCUMENTS

| 5,850,397 | A | 12/1998 | Raab |
| 7,536,448 | B2 * | 5/2009 | Hasan ................. H04L 41/0879 370/256 |

(Continued)

FOREIGN PATENT DOCUMENTS

| CN | 104158748 A | 6/2017 |
| CN | 109039786 A | 12/2018 |

OTHER PUBLICATIONS

"Application Topology Discovery", Patent Cooperation Treaty PCT Application No. IB2021/053236, filed on Apr. 20, 2021, 36 pages.

(Continued)

*Primary Examiner* — Anna C Deng
(74) *Attorney, Agent, or Firm* — Stephen R. Yoder; William H. Hartwell

(57) ABSTRACT

A computer implemented method for identifying an application topology includes identifying a sandbox environment corresponding to an application of interest, analyzing the sandbox environment to identify a set of communication links between services within the sandbox environment indicating a first topology, identifying a production system corresponding to the application of interest, querying the production system to identify a set of structural dependencies indicating a second topology, and creating a complete topology of the cloud application by combining the first topology and the second topology. A computer program product and computer system for identifying an application topology are additionally disclosed herein.

20 Claims, 8 Drawing Sheets

(51) Int. Cl.
*G06F 8/75* (2018.01)
*G06F 16/245* (2019.01)

(56) References Cited

U.S. PATENT DOCUMENTS

| | | | |
|---|---|---|---|
| 7,904,547 B2 | 3/2011 | Grabarnik | |
| 8,009,585 B2 | 8/2011 | Liu | |
| 8,028,058 B2 | 9/2011 | Ammerman, III | |
| 10,116,516 B2 | 10/2018 | Yuan | |
| 10,237,353 B2 | 3/2019 | Donin De Rosiere | |
| 10,389,596 B2* | 8/2019 | Strobel | H04L 41/5058 |
| 10,459,754 B2 | 10/2019 | Liu | |
| 2004/0046785 A1* | 3/2004 | Keller | G06F 9/5061 |
| | | | 715/734 |
| 2004/0210623 A1* | 10/2004 | Hydrie | H04L 49/90 |
| | | | 709/201 |
| 2009/0043912 A1* | 2/2009 | Archer | H04L 45/02 |
| | | | 709/242 |
| 2012/0275311 A1 | 11/2012 | Ivershen | |
| 2013/0007710 A1* | 1/2013 | Vedula | H04L 41/12 |
| | | | 717/124 |
| 2014/0164207 A1 | 6/2014 | Rotella | |
| 2015/0026667 A1* | 1/2015 | Pruss | H04L 41/0806 |
| | | | 717/135 |
| 2015/0029865 A1* | 1/2015 | Drobinsky | H04L 67/322 |
| | | | 370/238 |
| 2016/0035114 A1* | 2/2016 | Hesse | G06Q 10/00 |
| | | | 345/440 |
| 2016/0204916 A1* | 7/2016 | Dao | H04L 45/02 |
| | | | 709/226 |
| 2017/0118104 A1* | 4/2017 | Li | H04L 41/12 |
| 2018/0026869 A1 | 1/2018 | Essigmann | |
| 2019/0104047 A1* | 4/2019 | Tejaprakash | H04L 41/22 |
| 2019/0220321 A1* | 7/2019 | Yang | G06F 9/505 |
| 2020/0059420 A1 | 2/2020 | Abraham | |
| 2020/0322218 A1* | 10/2020 | Anwer | H04L 41/0866 |

OTHER PUBLICATIONS

Patent Cooperation Treaty PCT International Search Report and Written Opinion of the International Searching Authority, International application No. PCT/IB2021/053236, International filing date Apr. 20, 2021, Priority date May 26, 2020, 8 pages.
"Homepage | Linkerd", printed on Apr. 10, 2020, 3 pages, <https://linkerd.io/>.
"Istio / What is Istio?", printed on Apr. 10, 2020, 1 page, <https://istio.io/docs/concepts/what-is-istio/>.
"IT Management Software & Remote Monitoring Tools | SolarWinds", © 2020 SolarWinds Worldwide, LLC, 6 pages, <https://www.solarwinds.com/>.
"Jaeger: open source, end-to-end distributed tracing", printed on Apr. 10, 2020, 8 pages, <https://www.jaegertracing.io/>.
"OpenZipkin—A distributed tracing system", printed on Apr. 10, 2020, 1 page, <https://zipkin.io/>.
"Secure DevOps Platform for Cloud-Native | Sysdig", Copyright 2020 Sysdig, Inc., 9 pages, <https://sysdig.com/>.
"Software Intelligence for the Enterprise Cloud | Dynatrace", printed on Apr. 10, 2020, 5 pages, <https://www.dynatrace.com/>.
Branch et al., "BizMap: A Framework for Mapping Business Applications to IT Infrastructure", IFIP/IEEE IM 2015 Workshop: 10th International Workshop on Business-driven IT Management (BDIM), © 2015 IFIP, 7 pages.
Hwang et al., "Topology Discovery & Service Classification for Distributed-Aware Clouds", 2014 IEEE International Conference on Cloud Engineering, © 2014, IEEE, 6 pages.
Krein, Jakob, "Framework for application topology discovery to enable migration of business processes to the cloud". Thesis Jan. 2012 (Abstract), 7 pages.
Mell et al., "The NIST Definition of Cloud Computing", National Institute of Standards and Technology, U.S. Department of Commerce, Special Publication 800-145, Sep. 2011, 7 pages.

* cited by examiner

APPLICATION TOPOLOGY DISCOVERY

BACKGROUND

The present invention relates generally to the field of cloud computing, and more specifically to discovering the topology of an existing cloud computing environment.

The communication topology of a cloud application consists of a set of services utilized within the cloud application and their external dependencies or components, the API endpoints supported by the components, the directed source-destination communication links between them, and the API endpoint(s) of the destination component which the source component connects to in each link. Fine grained topology information can be critical in fault diagnosis and optimization of cloud applications that are running in production. Known solutions for discovering or inferring an application's topology include the use of cloud service meshes, service mesh observability tools, and open tracing tools. These types of tools require a level of instrumentation within an application, particularly a production environment, which may be considered intrusive. In various cases, the "physical" topology of a production environment may be available or discoverable based on knowledge of the components within the systems, but information regarding services or components in the production environment that are not physically apparent may not be readily available. Production environment owners/managers may be reluctant to make connection information such as this available, especially in scenarios where the application receives or manages sensitive information. The growing prevalence of distributed applications has increased the need for topology analysis that can make inferences and discoveries beyond the physical connections within applications.

SUMMARY

As disclosed herein, a computer implemented method for identifying an application topology includes identifying a sandbox environment corresponding to an application of interest. Once the sandbox environment is identified, the method proceeds by analyzing the sandbox environment to identify a set of communication links between services within the sandbox environment indicating a first topology. The method additionally includes identifying a production system corresponding to the application of interest, and querying said production system to identify a set of structural dependencies indicating a second topology. The method concludes by creating a complete topology of the cloud application by combining the first topology and the second topology. Said computer implemented method for identifying an application topology may enable topology discovery without requiring intrusive instrumentation or extensive analysis of a production environment. Said computer implemented method for identifying an application topology may additionally include matching services in the sandbox environment to services in the production system by matching infrastructure information used by the services. Matching services in the sandbox environment to services in the production system in this manner enables establishing a correspondence between the services present in the sandbox environment, whose topology is accessible, and the services present in the production system, which may be more difficult to analyze, which can ultimately allow corresponding communication links to be identified. Said computer implemented method for identifying an application topology may additionally include using service-to-service communication links in the sandbox environment to establish corresponding links between services in the production system. Matching the communication links in the sandbox environment to services present in the production system enables the inference of links in the production system's topology without requiring instrumentation of the production system.

A computer program product for identifying an application topology includes one or more computer readable storage media and program instructions stored on the one or more computer readable storage media, the program instructions comprising instructions to identify a sandbox environment corresponding to an application of interest. The computer program product additionally includes instructions to analyze the sandbox environment to identify a set of communication links between services within the sandbox environment indicating a first topology. The computer program product additionally includes instructions to identify a production system corresponding to the application of interest and query the production system to identify a set of structural dependencies indicating a second topology. The computer program product additionally includes instructions to create a complete topology of the cloud application by combining the first topology and the second topology. Said computer program product may enable execution of a method for identifying an application topology without requiring intrusive instrumentation or extensive analysis of a production environment. Said computer program product may additionally include instructions to match services in the sandbox environment to services in the production system by matching infrastructure information used by the services. Said computer program product for identifying an application topology may additionally include instructions to use service-to-service communication links in the sandbox environment to establish corresponding links between services in the production system.

As disclosed herein, a computer system for identifying an application topology includes one or more computer processors, one or more computer-readable storage media, program instructions stored on the computer-readable storage media for execution by at least one of the one or more processors, the program instructions comprising instructions to identify a sandbox environment corresponding to an application of interest. The computer system additionally includes instructions to analyze the sandbox environment to identify a set of communication links between services within the sandbox environment indicating a first topology. The computer system additionally includes instructions to identify a production system corresponding to the application of interest and query the production system to identify a set of structural dependencies indicating a second topology. The computer system additionally includes instructions to create a complete topology of the cloud application by combining the first topology and the second topology. Said computer program product may enable execution of a method for identifying an application topology without requiring intrusive instrumentation or extensive analysis of a production environment. Said computer system may additionally include instructions to match services in the sandbox environment to services in the production system by matching infrastructure information used by the services. Said computer system for identifying an application topology may additionally include instructions to use service-to-service communication links in the sandbox environment to establish corresponding links between services in the production system.

DETAILED DESCRIPTION

Figure 1:
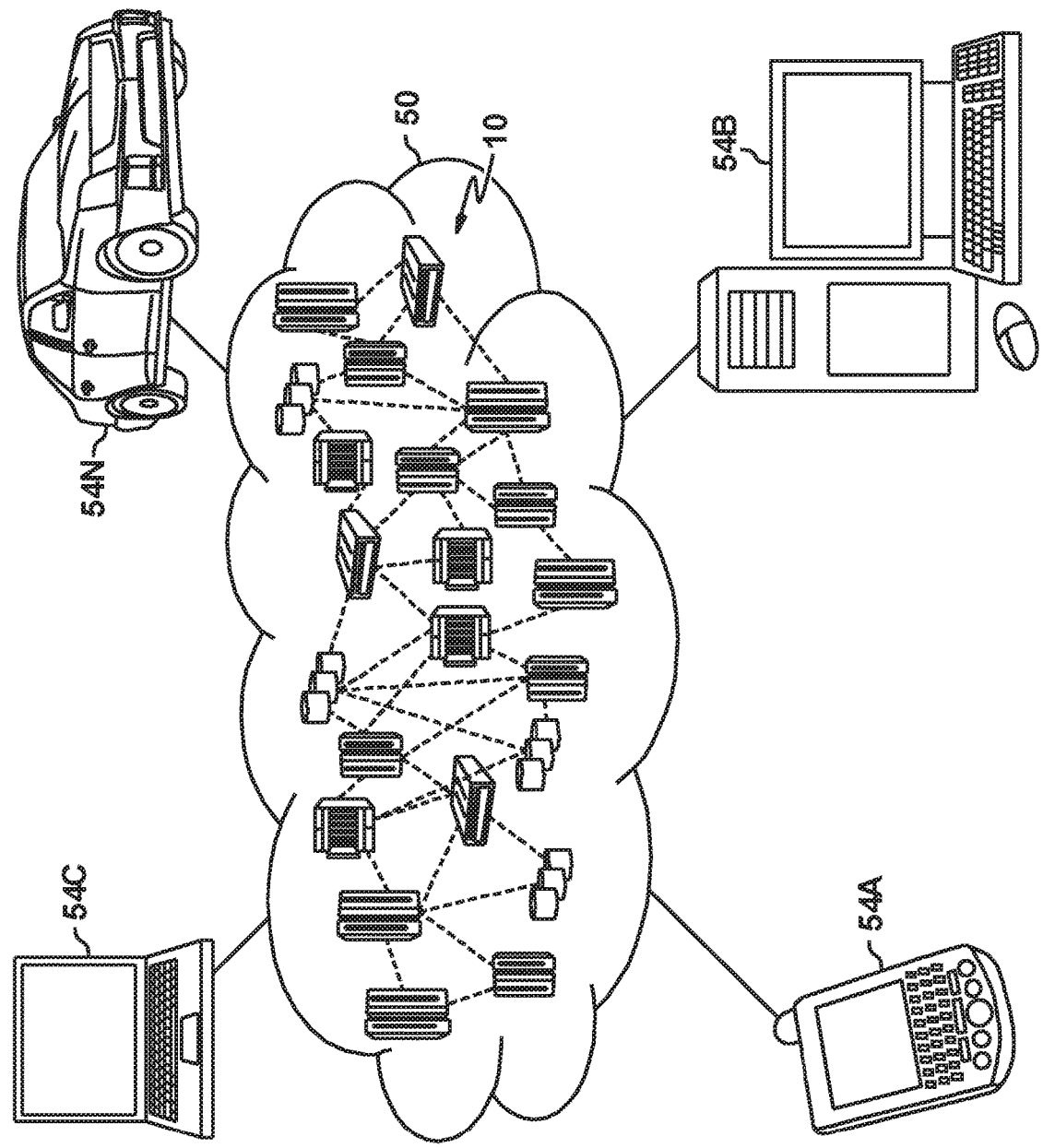
FIG. 1 depicts a cloud computing environment according to an embodiment of the present invention.

Embodiments of the present invention analyze and construct an existing topology through a combination of passive querying and instrumenting sandbox environments (such as test environments, development environments, and staging environments), without conducting intrusive analysis of any corresponding production systems.

The present invention will now be described in detail with reference to the Figures. Implementation of embodiments of the invention may take a variety of forms, and exemplary implementation details are discussed subsequently with reference to the Figures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
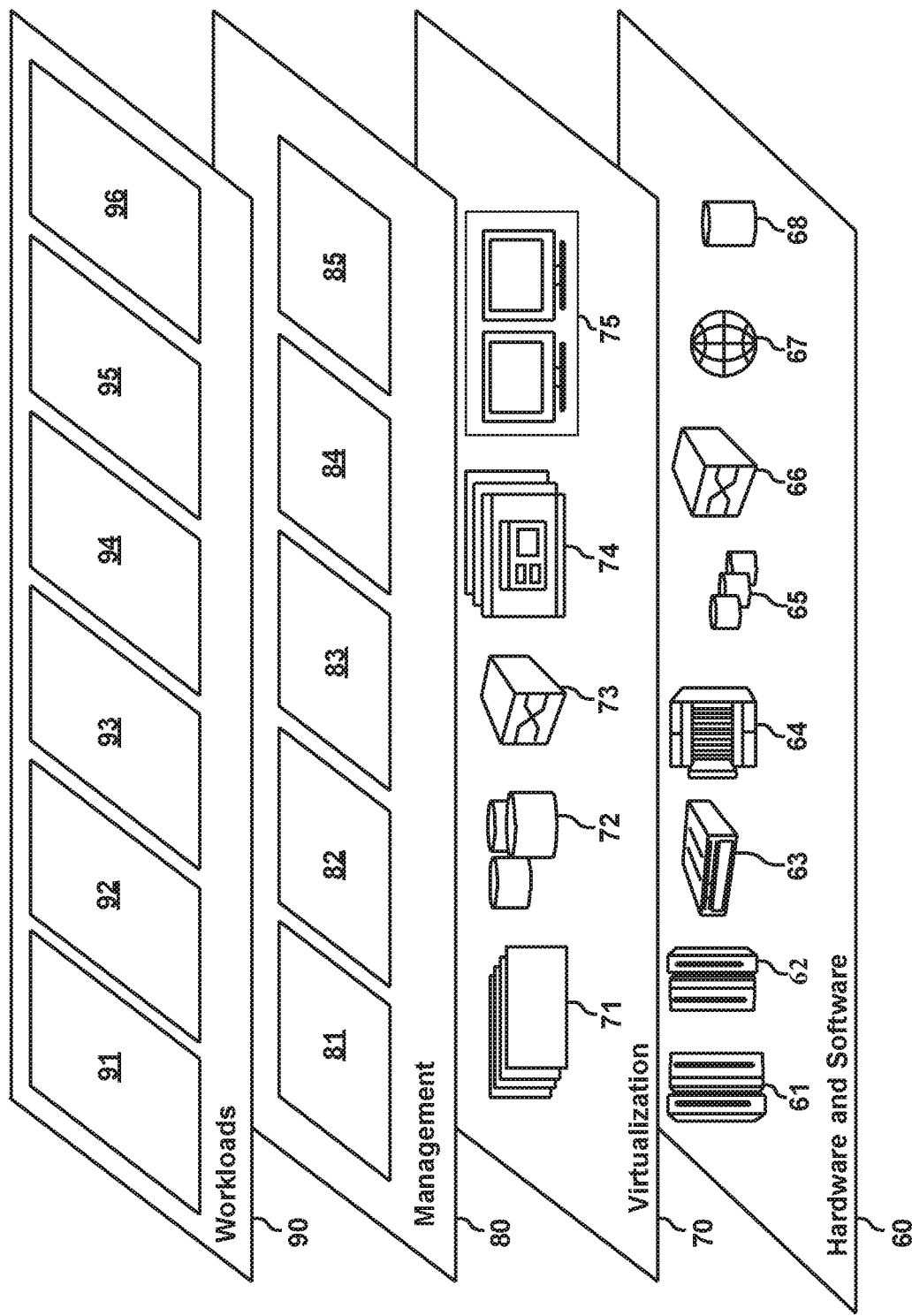
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components includes: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer includes: mapping and navigation 91; software development and lifecycle management 92; virtual classroom education delivery 93; data analytics processing 94; transaction processing 95; and topology discovery 96.

Figure 3:
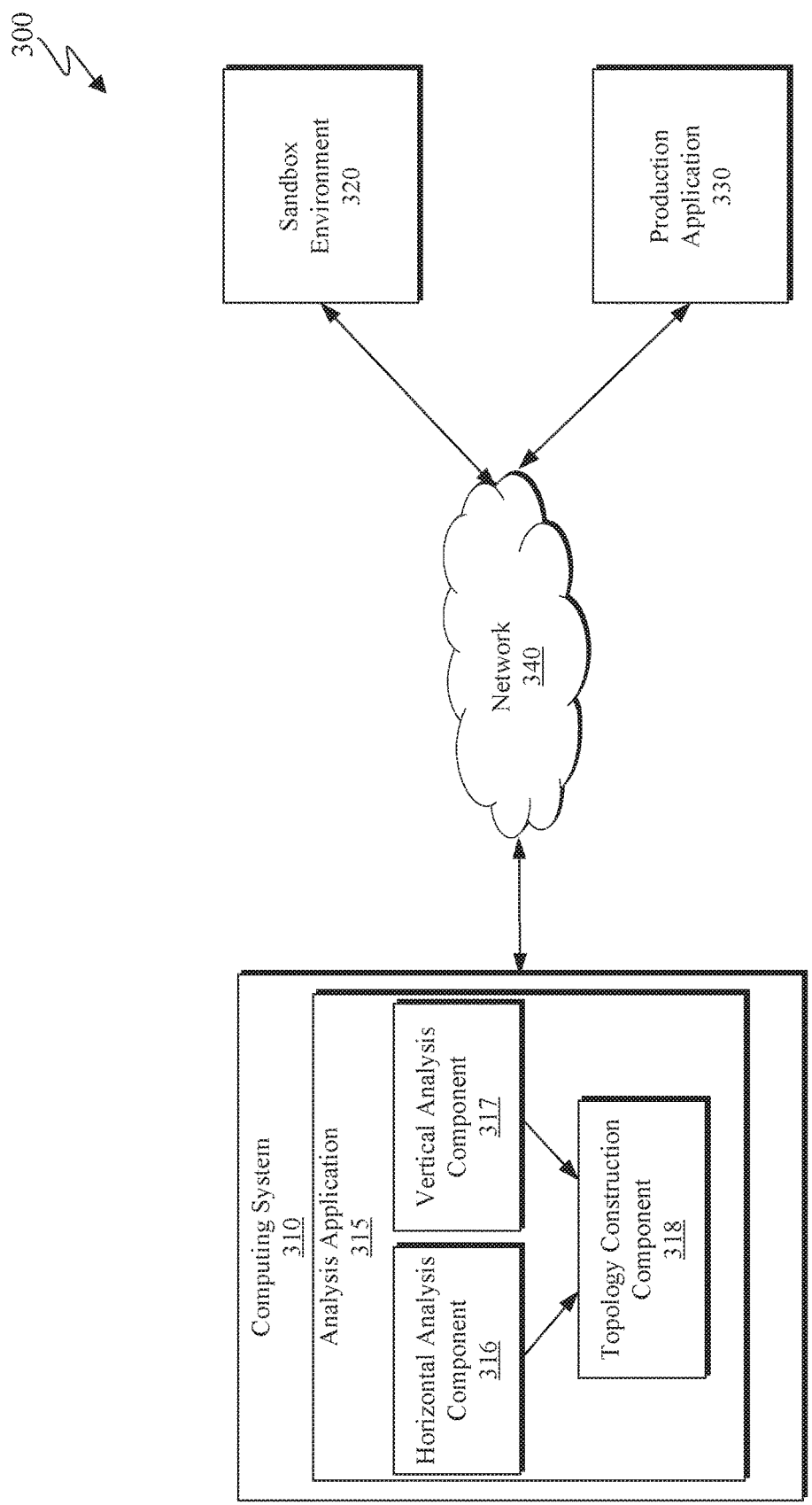
FIG. 3 is a block diagram depicting a topology analysis system in accordance with at least one embodiment of the present invention.

FIG. 3 is a block diagram depicting a topology analysis system 300 in accordance with at least one embodiment of the present invention. As depicted, topology analysis system 300 includes computing system 310, sandbox environment 320, production application 330, and network 340. Topology analysis system 300 may be configured to execute non-invasive analysis of a cloud application's topology.

Computing system 310 can be a desktop computer, a laptop computer, a specialized computer server, or any other computer system known in the art. In some embodiments, computing system 310 represents computer systems utilizing clustered computers to act as a single pool of seamless resources. In general, computing system 310 is representative of any electronic device, or combination of electronic devices, capable of receiving and transmitting data, as described in greater detail with regard to FIG. 8. Computing system 310 may include internal and external hardware components, as depicted and described in further detail with respect to FIG. 8.

As depicted, computing system 310 comprises analysis application 315. Analysis application 315 may be an application configured to analyze the topology of a cloud production application. In at least one embodiment, analysis application 315 is configured to analyze cloud applications in a non-invasive manner, without requiring access to sensitive data. In general, analysis application 315 is configured to execute a topology discovery method. One embodiment of an appropriate topology discovery method is described with respect to FIG. 4.

As depicted, analysis application 315 includes horizontal analysis component 316, vertical analysis component 317, and topology construction component 318. Each of horizontal analysis component 316, vertical analysis component 317, and topology construction component 318 may include their own dedicated memory units or processing units, or may alternatively leverage shared memory units and processing units housed within computing system 310 or analysis application 315. In combination, horizontal analysis component 316, vertical analysis component 317, and topology construction component 318 may be configured to execute certain steps of a topology discovery method, such as the topology discovery method described with respect to FIG. 4.

Horizontal analysis component 316 is configured to analyze sandbox environment 320 to identify a set of communication links between services may include identifying one or more services contained within the sandbox environment. In at least some embodiments, horizontal analysis component is configured to determine which of the identified one or more services communicate with one another to establish a set of communication links. Horizontal analysis component 316 may additionally be configured to monitor any instrumentation tools present in an application. In at least some embodiments, horizontal analysis component 316 is further configured to use static analysis of code elements, such as environment variables, to identify existing communication links. Horizontal analysis component may additionally be configured to identify one or more service names corresponding to the identified one or more services contained within the sandbox environment.

Vertical analysis component 317 may be configured to query production application 330 to identify a set of structural dependencies. In at least one embodiment, vertical analysis component 317 is configured to send a query to one or more components of production application 330 to request information regarding one or more components of the production application. Vertical analysis component 317 may additionally be configured to, for each component, inherit APIs from a corresponding component in sandbox environment 320 as well as source-destination links based on the corresponding source-destination links in the sandboxed components. Vertical analysis component 317 may additionally be configured to query production application 330 for any of services, pods, deployments, daemon sets, replica sets, stateful sets, nodes, or egress network policies. In at least some embodiments, vertical analysis component 317 is configured to request names of the components in production application 330, as well as IDS of container images backing services in the production system.

Topology construction component 318 may be configured to combining the horizontal topology and the vertical topology provided by horizontal analysis application 316 and vertical analysis application 317. In at least one embodiment, topology construction component 318 is configured to match IDs of container images backing the services in sandbox environment 320 with the IDs of container images backing the services in production application 330. Topology construction component 318 may be configured to match the names of services in sandbox environment 320 with names of the services in production application 330. In at least one embodiment, topology construction component 318 is configured to compute a network fingerprint of the traffic emanating from services in sandbox environment 320 and the production application 330. In such embodiments, topology construction component 318 may additionally be configured to execute a similarity match algorithm on the network fingerprints. Topology construction component 318 may further be configured to solicit feedback or additional information from users regarding the constructed topology.

Sandbox environment 320 may correspond to a testing environment intended to be representative of the cloud application of interest. In at least some embodiments, sandbox environment 320 is an environment in which code can be tested with respect to the cloud application without exposing live servers and their data to possibly damaging changes or errors. In some embodiments, sandbox environment 320 corresponds to a staging environment intended to be representative of the cloud application of interest. The staging environment may be a nearly exact replica of a production environment intended for testing codes, builds, or updates to ensure quality under a production-like environment before the application is deployed. In some embodiments, sandbox environment 320 corresponds to a development environment. The development environment corresponds to a collection of procedures and tools for testing and debugging the cloud application of interest. The development environment, sometimes called an integrated development environment or IDE, may include any of a compiler, interpreter, source code editor, set of build automation tools, and a debugger. In some embodiments, sandbox environment 320 may be representative of some combination of staging environments, development environments, and testing environments.

Production application 330 corresponds to a functional cloud application. Production application 330 may be the final version of the cloud application the sandbox environment 320 represents. An example embodiment of a suitable production application is depicted with respect to FIGS. 6 and 7.

Network 340 can be, for example, a local area network (LAN), a wide area network (WAN) such as the Internet, or a combination of the two, and include wired, wireless, or fiber optics connections. In general, network 340 can be any combination of connections and protocols that will support communications between computing system 310, sandbox environment 320, and production application 330.

Figure 4:
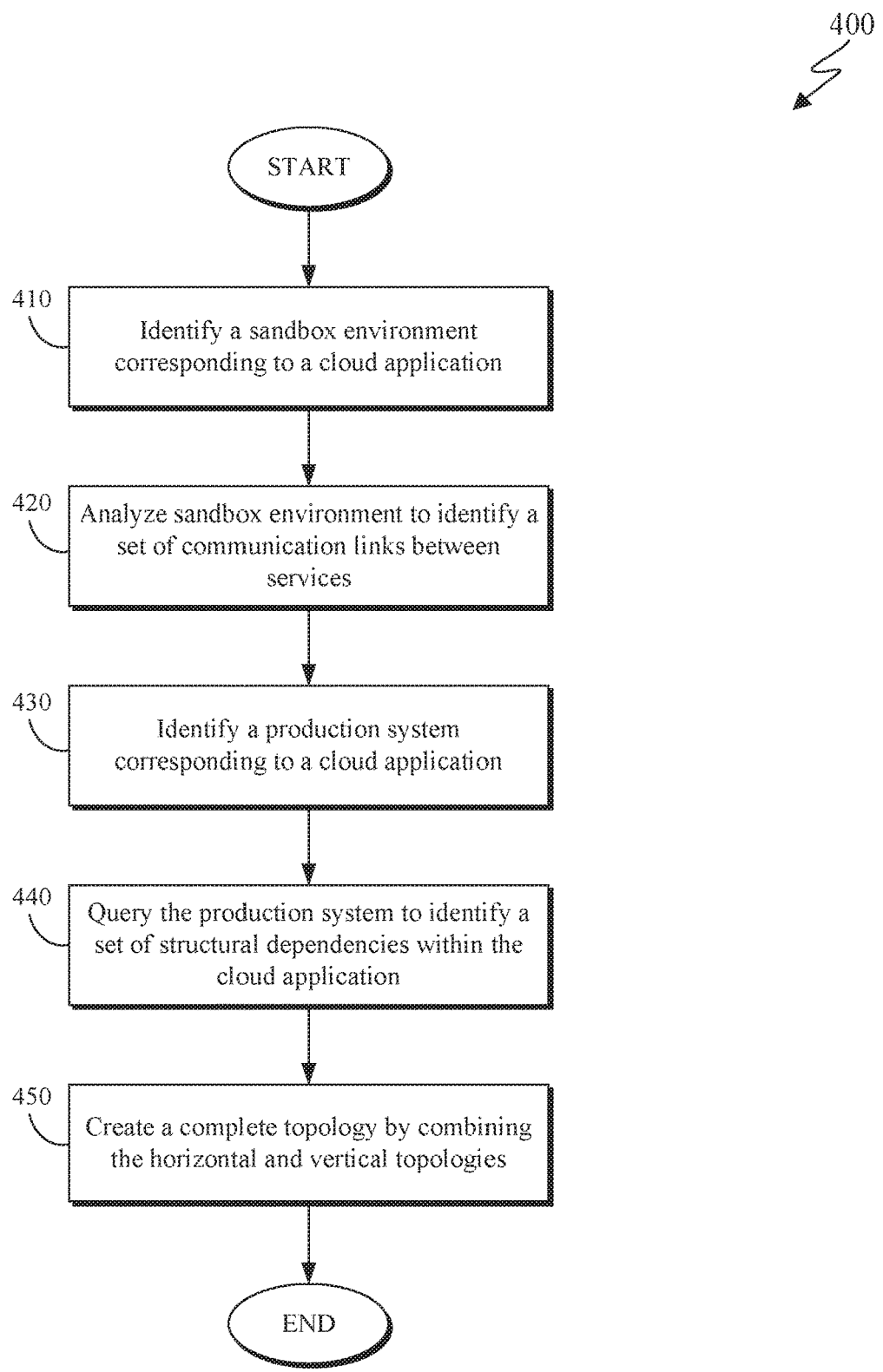
FIG. 4 is a flowchart depicting a topology discovery method in accordance with at least one embodiment of the present invention.

FIG. 4 is a flowchart depicting a topology discovery method 400 in accordance with at least one embodiment of the present invention. As depicted, topology discovery method 400 includes identifying (410) a sandbox environment corresponding to a cloud application, analyzing (420) the sandbox environment to identify a set of communication links between services, identifying (430) a production system corresponding to the cloud application, querying (440) the production system to identify a set of structural dependencies, and creating (450) a complete topology of the cloud application by combining the horizontal topology and the vertical topology. Topology discovery method 400 may be utilized to conduct a non-invasive analysis of a cloud application's topography.

Identifying (410) a sandbox environment corresponding to a cloud application may include receiving or identifying a request to analyze a specified cloud application or a cloud application of interest. In at least some embodiments, the sandbox environment corresponds to a testing environment intended to be representative of the cloud application of interest. The testing environment provides an environment in which code can be tested with respect to the cloud application without exposing live servers and their data to possibly damaging changes or errors. In some embodiments, the sandbox environment corresponds to a staging environment intended to be representative of the cloud application of interest. The staging environment may be a nearly exact replica of a production environment intended for testing codes, builds, or updates to ensure quality under a production-like environment before the application is deployed. In some embodiments, the sandbox environment corresponds to a development environment. The development environment corresponds to a collection of procedures and tools for testing and debugging the cloud application of interest. The development environment, sometimes called an integrated development environment or IDE, may include any of a compiler, interpreter, source code editor, set of build automation tools, and a debugger. Identifying (410) a sandbox environment corresponding to a cloud application may additionally include sending a request for access to the appropriate sandbox environment. In such embodiments, the permissions request may be sent to the owner/controller of the cloud application and corresponding sandbox environment. In at least some embodiments, identifying (410) a sandbox environment corresponding to a cloud application additionally includes identifying a sandbox environment that most closely represents the cloud application. In at least some embodiments, a horizontal analysis component, such as horizontal analysis component 316 described with respect to FIG. 3, is configured to carry out the processes associated with identifying (420) a sandbox environment corresponding to a cloud application.

Analyzing (420) the sandbox environment to identify a set of communication links between services may include identifying one or more services contained within the sandbox environment. The set of communication links between services may alternatively be referred to as a horizontal topology herein. In additional embodiments, the set of communication links between services may alternatively be referred to as a first topology. It should be appreciated that the terms horizontal topology or first topology do not indicate a physical orientation of the topology or an ordering of the occurrence of the topology. Analyzing (420) the sandbox environment may further include determining which of the identified one or more services communicate with one another to establish a set of communication links. In at least one embodiment, analyzing (420) the sandbox environment includes instrumenting the cloud application using existing service mesh observability tools to enable connection visibility. A service mesh is a dedicated infrastructure layer built into an application configured to control how different parts of said application communicate with one another. In embodiments where the cloud application of interest includes a service mesh layer, analyzing (420) the sandbox environment includes analyzing the service mesh to identify a communication infrastructure between the one or more services contained within the sandbox environment. Analyzing (420) the sandbox environment to identify a set of communication links between services may include using static analysis of code elements, such as environment variables, to identify existing communication links. In some embodiments, analyzing (420) the sandbox environment includes analyzing Domain Name System (DNS) queries to identify existing communication links between services. Analyzing (420) the sandbox environment may additionally include identifying one or more service names corresponding to the identified one or more services contained within the sandbox environment. In at least one embodiment, analyzing (420) the sandbox environment includes identifying IDs of container images backing the services in the sandbox environment. In at least some embodiments, a horizontal analysis component, such as horizontal analysis component 316 described with respect to FIG. 3, is configured to carry out the processes associated with analyzing (420) the sandbox environment.

Identifying (430) a production system corresponding to the cloud application may include querying the cloud application or the corresponding sandbox environment for information regarding the corresponding production system. In at least one embodiment, identifying (430) a production system corresponding to the cloud application includes identifying a production system that is connected to or associated with at least one of the one or more services contained within the sandbox environment. Identifying (430) a production system corresponding to the cloud application may include receiving information identifying/indicating a production system that is associated with the cloud application. In at least some embodiments, identifying (430) a production system corresponding to the cloud application includes requesting access to the production system, or attempting to establish a connection with the production system such that queries and query responses may be sent/received. In at least some embodiments, a vertical analysis component, such as vertical analysis component 317 described with respect to FIG. 3, is configured to carry out the processes associated with identifying (430) a production system corresponding to the cloud application.

Querying (440) the production system to identify a set of structural dependencies may include sending a query to one or more components of the production system to request information regarding one or more components of the production system. The set of structural dependencies may otherwise be referred to as a vertical topology. In additional embodiments, the set of structural dependencies (or the vertical topology) may be referred to as a second topology. It should be appreciated that the terms vertical topology or second topology do not indicate a physical orientation of the topology or an ordering of the occurrence of the topology. In at least one embodiment, querying (440) the production system includes, for each component in the production system, inheriting APIs from the corresponding component in the sandbox environment as well as source-destination links based on the corresponding source-destination links in the sandboxed components. In other words, in embodiments where a component in the production system indeed has a corresponding component present in the sandbox environment, it is inferred that said component also has the same connection links and APIs as the corresponding sandbox component. In such embodiments, querying (440) the production system to identify a set of structural dependencies includes updating the set of structural dependencies to reflect the APIs indicated by the corresponding component (s) in the sandbox environment. In instances where a corresponding component does not exist in the sandbox environment, the component may either be tagged as missing information or disregarded. Querying (440) the production system to identify a vertical topology may further include querying the production system for any of services, pods, deployments, daemon sets, replica sets, stateful sets, nodes, or egress network policies. Querying the production system to identify a vertical topology may additionally include requesting names of the components in the production system. In at least some embodiments, querying (440) the production system additionally includes requesting the IDs of container images backing services in the production system. In at least some embodiments, a vertical analysis component, such as vertical analysis component 317 described with respect to FIG. 3, is configured to carry out the processes associated with querying (440) the production system to identify a set of structural dependencies.

Creating (450) a complete topology of the cloud application by combining the horizontal topology and the vertical topology may include combining the identified set of communication links identified in step 420 and the set of structural dependencies identified in step 440 to create a complete topology of the cloud application. Creating (450) a complete topology of the cloud application may include matching the IDs of container images backing the services in the sandbox environments with the IDs of container images backing the services in the production application. In additional embodiments, such as those where the container image IDs are unavailable, creating (450) a complete topology of the cloud application includes matching the names of services in the sandbox environment with names of the services in the production application. Creating (450) a complete topology of the cloud application may include computing a network fingerprint of the traffic emanating from services in the sandbox environment and the production application. Such embodiments may additionally include executing a similarity match algorithm on the network fingerprints. Creating (450) a complete topology of the cloud application may additionally include transferring information about the communication links in the sandbox environment to the production environment. One example of a process for joining two topologies could be through discovering similar nodes from nodes' structural properties and connectiveness which are related to vertical topology (for example using the structural similarity of local neighborhoods to derive pairwise similarity scores for the nodes of two different graphs) and then to infer prod nodes' properties related to horizontal topology from similar sandbox nodes. In some embodiments, such as those where some of the queried information is incomplete, the complete topology may be augmented or edited or tuned by experts.

In at least some embodiments, a topology construction component, such as topology construction component 318 described with respect to FIG. 3, is configured to carry out the processes associated with creating (450) a complete topology of the application.

Figure 5:
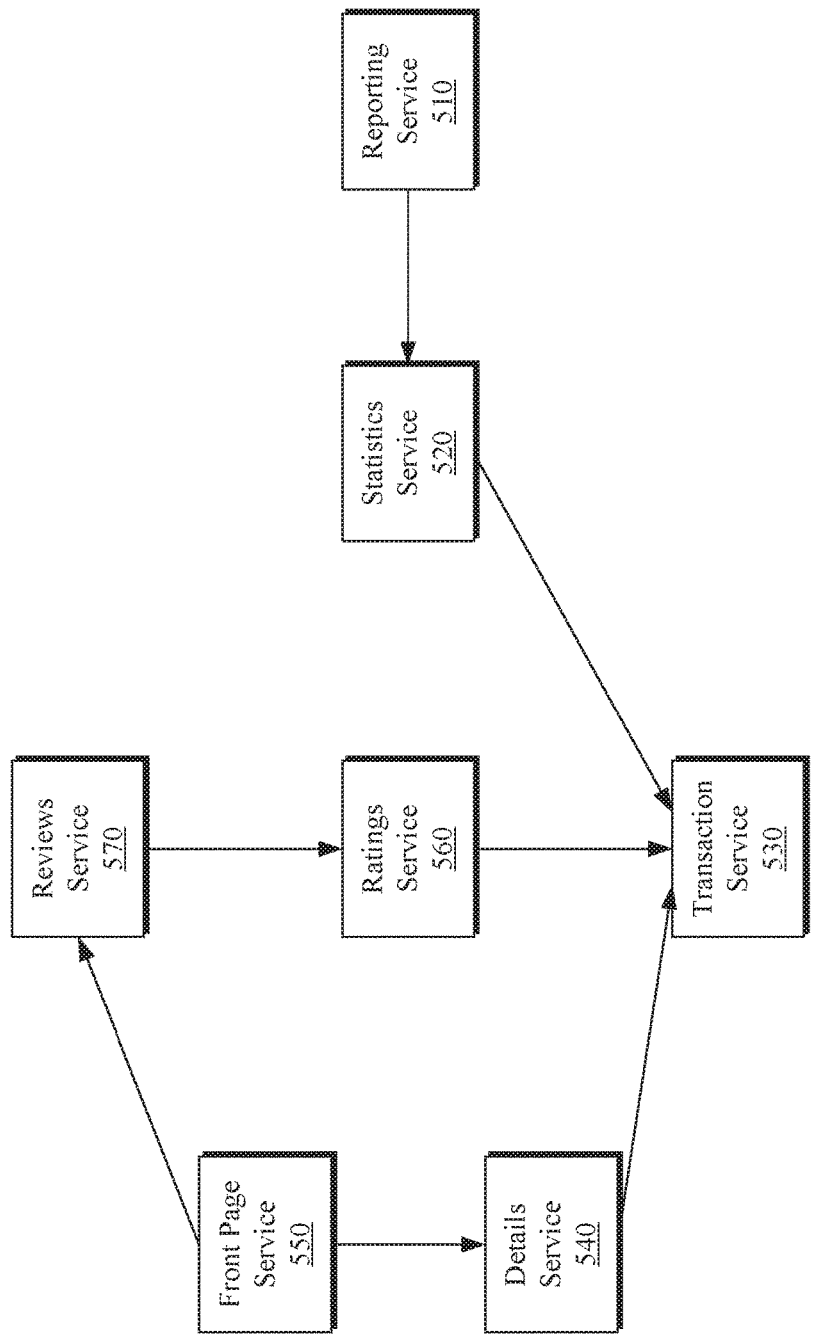
FIG. 5 depicts a block diagram of a horizontal topology in accordance with at least one embodiment of the present invention.
Figure 6:
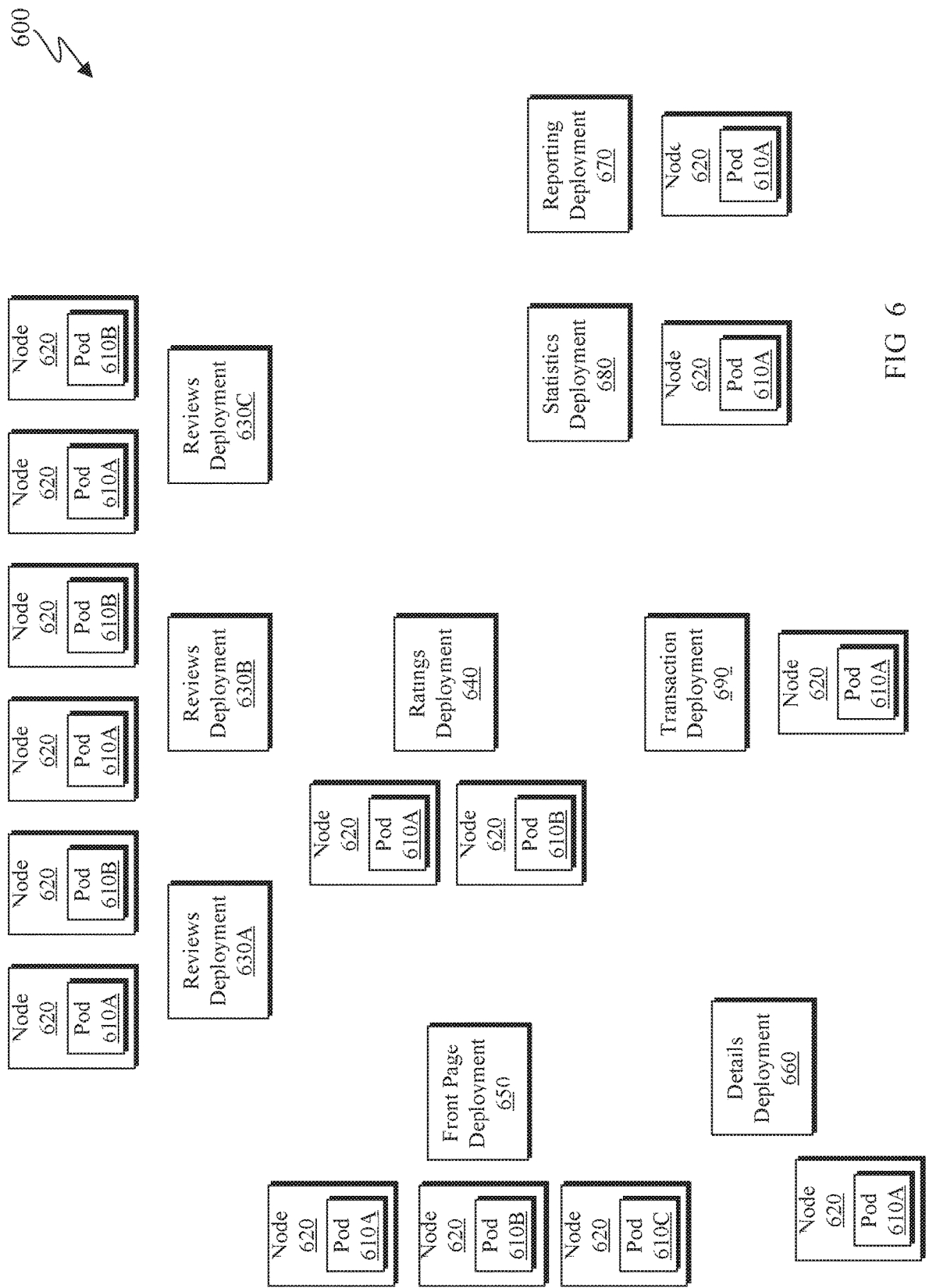
FIG. 6 depicts a block diagram of a vertical topology in accordance with an exemplary embodiment of the present invention.
Figure 7:
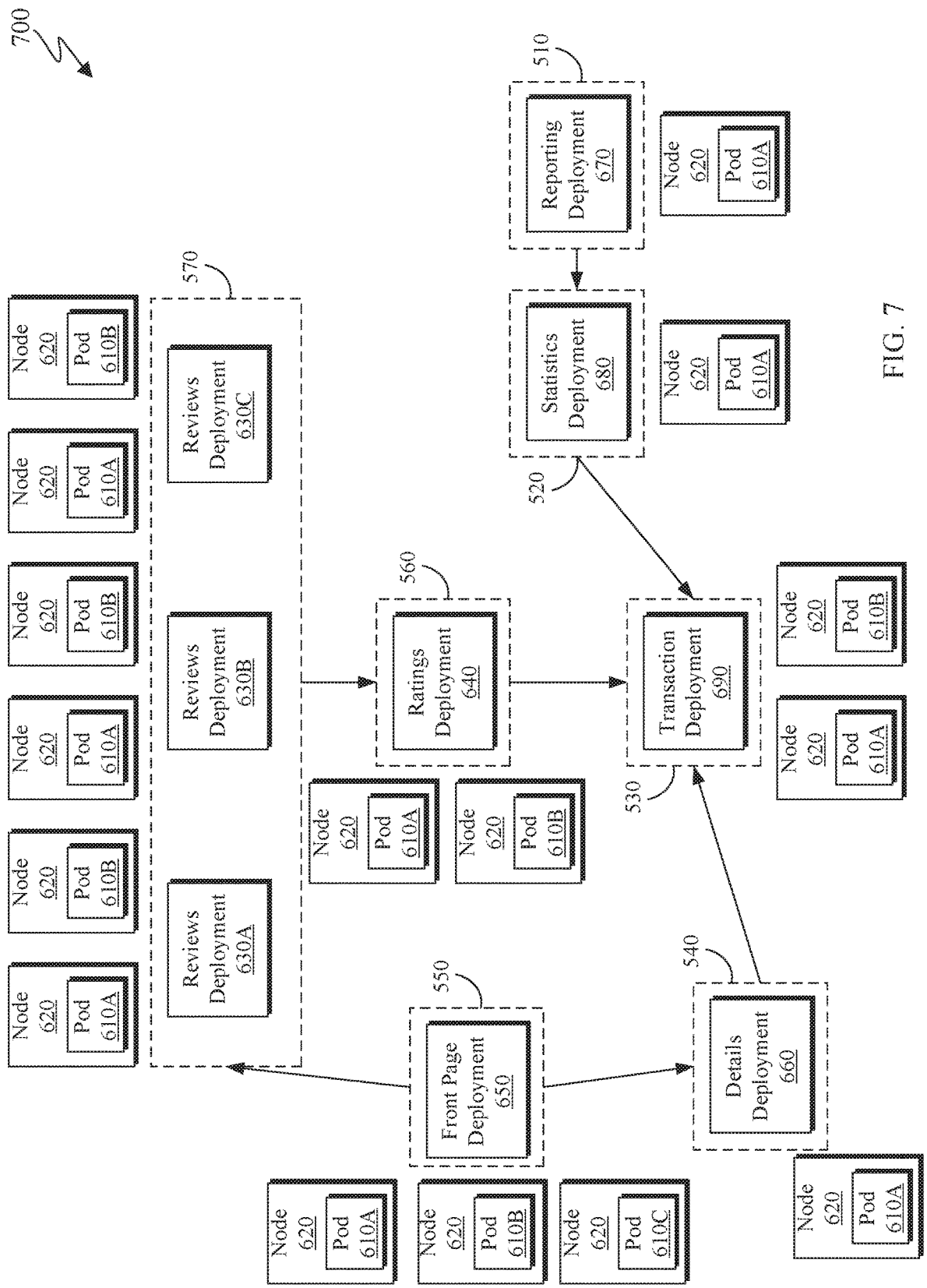
FIG. 7 depicts a complete topology in accordance with an exemplary embodiment of the present invention.

With respect to FIGS. 5, 6, and 7, an exemplary embodiment of an application and the corresponding services and service deployments within the application are depicted. It should be appreciated that, while the depicted embodiment includes a variety of specific services and deployments by name, and displays the connections between these specific services and deployments, any number of applications may be suitable for analysis using the methods discussed herein, and it should not be limited to applications containing strictly combinations of the services discussed with respect to these figures. Rather, the services and service deployments depicted and discussed are representative of any application or service present within an application responsible for sending and/or receiving data within some capacity associated with said application. With respect to the depicted embodiment, each service may conduct a variety of operations on the data, or may conduct no operations on the data, or anywhere in between; relative to the methods disclosed herein, it is the mere presence of these services/deployments/applications that will be analyzed, as well as their communications with one another. Regarding the communications/connections between various services and deployments, the methods disclosed herein do not analyze data within any communications made via these connections, but rather detect the presence of these connections to determine which services communicate with one another within the application. It should therefore be appreciated that the services, deployments, and other various structures/applications depicted with respect to FIGS. 5, 6, and 7 are intended to be representative of an application in accordance with a single embodiment of the present invention, but are not intended to be a comprehensive list of services capable of being analyzed using the methods herein nor a list of required components.

FIG. 5 depicts a block diagram of a horizontal topology 500 in accordance with at least one embodiment of the present invention. The depicted embodiment includes a set of sample services that may be present within a sandbox environment, but should be considered just one example of the many combinations of services that me be present in other embodiments of the present invention. As depicted, horizontal topology 500 includes reporting service 510, statistics services 520, transaction service 530, details service 540, front page service 550, ratings service 560, and reviews service 570. FIG. 5 additionally depicts the flow of data between the depicted services. As depicted, reporting service 510 provides reporting data to statistics service 520. Statistics service 520 process the received reporting data, and provides statistics and analytics to transaction service 530. Front page service 550 provides page information to both reviews service 570 and details service 540. Reviews service 570 processes the received page information and provides review information to ratings service 560. Details service 540 processes the received page information and provides detail information to transaction service 530.

FIG. 6 depicts a block diagram of a vertical topology 600 in accordance with an exemplary embodiment of the present invention. The depicted embodiment includes a set of sample structures and dependencies that may be present within a production application, but should be considered just one example of the many combinations of structures and dependencies that may be present in additional embodiments of the present invention. As depicted, vertical topology 600 includes pods 610, nodes 620, reviews deployments 630, ratings deployment 640, front page deployment 650, details deployment 660, reporting deployment 670, statistics deployment 680, and transaction deployment 690. Pods 610 (610A, 610B, 610C) may each represent a single instance of a running process/micro-service in the cluster. Nodes 620 may communicate with one another. They may be grouped (not shown) physically or virtually, in one or more networks, such as Private, Community, Public, or Hybrid clouds as described hereinabove, or a combination thereof. It is understood that nodes 620 can communicate with any type of computerized device over any type of network and/or network addressable connection (e.g., using a web browser). In some embodiments, each depicted node 620 may correspond to a unique node; in other embodiments, some of the depicted nodes 620 correspond to a same node. It should be appreciated that the deployments are depicted alongside their corresponding nodes and pods, and which deployments are associated with each node can vary from embodiment to embodiment. Reviews deployment(s) 630 (630A, 630B, 630C) corresponds to a specific deployment (or deployments) of one or more reviews services, such as the review service described with respect to FIG. 5. Ratings deployment 640 corresponds to a specific deployment of a ratings service, such as the ratings service described with respect to FIG. 5. Front page deployment 650 corresponds to a specific deployment of a front page service, such as the front page service described with respect to FIG. 5. Details deployment 660 corresponds to a specific deployment of a details service, such as the details service described with respect to FIG. 5. Reporting deployment 670 corresponds to a specific deployment of a reporting service, such as the reporting service described with respect to FIG. 5. Statistics deployment 680 corresponds to a specific deployment of a statistics service, such as the statistics service described with respect to FIG. 5. Transaction deployment 690 corresponds to a specific implementation of a transaction service, such as the transaction service described with respect to FIG. 5. As depicted, vertical topology 600 does not include comprehensive information regarding the connections between services or deployments.

FIG. 7 depicts a complete topology 700 in accordance with an exemplary embodiment of the present invention. As depicted, complete topology 700 represents a combination of horizontal topology 500 and vertical topology 600. The dotted lines surrounding the vertical topology components (various specific deployments) and the corresponding labels indicate the services from the horizontal topology to which they correspond, and the arrows in complete topology 700 correspond to the communication links between the indicated services. Typical sandbox is built with minimal configuration and resources to provide a way to train and gain real, hands-on experience without accessing production deployment that might also have sensitive data. As depicted, the services in the horizontal topology in FIG. 5 have been matched to the deployments in the vertical topology in FIG. 6 based on the service names, but could alternatively been matched using container image IDs.

Figure 8:
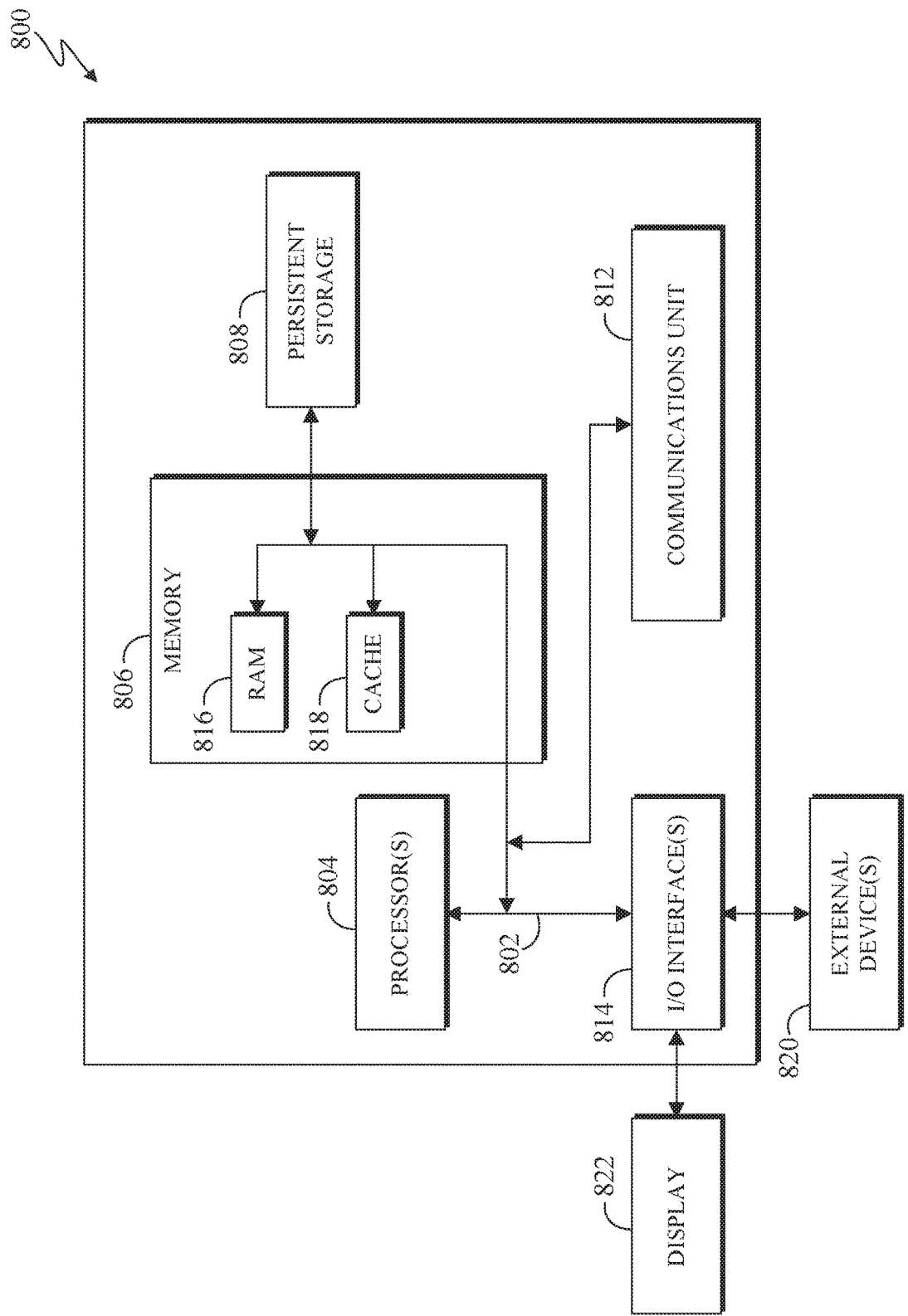
FIG. 8 is a block diagram of components of a computing system executing the image analysis system in accordance with an embodiment of the present invention.

FIG. 8 depicts a block diagram of components of computing system 110 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

As depicted, the computer 800 includes communications fabric 802, which provides communications between computer processor(s) 804, memory 806, persistent storage 808, communications unit 812, and input/output (I/O) interface(s) 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 816 and cache memory 818. In general, memory 806 can include any suitable volatile or non-volatile computer-readable storage media.

One or more programs may be stored in persistent storage 808 for access and/or execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links.

I/O interface(s) 814 allows for input and output of data with other devices that may be connected to computer 800. For example, I/O interface 814 may provide a connection to external devices 820 such as a keyboard, keypad, a touch screen, and/or some other suitable input device. External devices 820 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 808 via I/O interface(s) 814. I/O interface(s) 814 also connect to a display 822.

Display 822 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for identifying an application topology, the method comprising:
   identifying a sandbox environment corresponding to an application of interest;
   analyzing the sandbox environment to identify a set of communication links between services within the sandbox environment indicating a first topology;
   identifying a production system corresponding to the application of interest;
   querying the production system to identify a set of structural dependencies indicating a second topology; and
   creating a complete topology of the application of interest by combining the first topology and the second topology.

2. The computer implemented method of claim 1, wherein creating the complete topology of the application of interest comprises matching services in the sandbox environment to services in the production system by matching infrastructure information used by the services.

3. The computer implemented method of claim 1, wherein creating the complete topology of the application of interest comprises using service-to-service communication links in the sandbox environment to establish corresponding links between services in the production system.

4. The computer implemented method of claim 1, further comprising instrumenting the sandbox environment using one or more observability tools.

5. The computer implemented method of claim 1, wherein analyzing the sandbox environment to identify the set of communication links includes conducting static analysis of code and environmental variables present in the sandbox environment.

6. The computer implemented method of claim 1, wherein analyzing the sandbox environment to identify the set of communication links includes analyzing Domain Name Service (DNS) queries corresponding to the sandbox environment.

7. The computer implemented method of claim 1, wherein identifying the set of structural dependencies indicating the second topology comprises matching IDs from container images backing the services in the sandbox environment to IDs from container images backing the services in the production application.

8. A computer program product for identifying an application topology, the computer program product comprising:
   one or more computer readable storage media and program instructions stored on the one or more computer readable storage media, the program instructions comprising instructions to:
   identify a sandbox environment corresponding to an application of interest;
   analyze the sandbox environment to identify a set of communication links between services within the sandbox environment;
   identify a production system corresponding to the application of interest; query the production system to identify a set of structural dependencies indicating a second topology; and
   create a complete topology of the application of interest by combining the first topology and the second topology.

9. The computer program product of claim 8, wherein instructions to create the complete topology of the application of interest comprise instructions to match services in the sandbox environment to services in the production system by matching infrastructure information used by the services.

10. The computer program product of claim 8, wherein instructions to create the complete topology of the application of interest comprise instructions to use service-to-service communication links in the sandbox environment to establish corresponding links between services in the production system.

11. The computer program product of claim 8, further comprising instructions to instrument the sandbox environment using one or more observability tools.

12. The computer program product of claim 8, wherein instructions to analyze the sandbox environment to identify the set of communication links comprise instructions to conduct static analysis of code and environmental variables present in the sandbox environment.

13. The computer program product of claim 8, wherein instructions to analyze the sandbox environment to identify the set of communication links comprise instructions to analyze Domain Name Service (DNS) queries corresponding to the sandbox environment.

14. The computer program product of claim 8, wherein instructions to identify the set of structural dependencies indicating the second topology comprise instructions to match IDs from container images backing the services in the sandbox environment to IDs from container images backing the services in the production application.

15. A computer system for identifying an application topology, the computer system comprising:
one or more computer processors;
one or more computer-readable storage media;
program instructions stored on the computer-readable storage media for execution by at least one of the one or more processors, the program instructions comprising instructions to:
identify a sandbox environment corresponding to an application of interest;
analyze the sandbox environment to identify a set of communication links between services within the sandbox environment indicating a first topology;
identify a production system corresponding to the application of interest; query the production system to identify a set of structural dependencies indicating a second topology; and
create a complete topology of the application of interest by combining the first topology and the second topology.

16. The computer system of claim 15, wherein instructions to create the complete topology of the application of interest comprise instructions to match services in the sandbox environment to services in the production system by matching infrastructure information used by the services.

17. The computer system of claim 15, wherein instructions to create the complete topology of the application of interest comprise instructions to use service-to-service communication links in the sandbox environment to establish corresponding links between services in the production system.

18. The computer system of claim 15, further comprising instructions to instrument the sandbox environment using one or more observability tools.

19. The computer system of claim 15, wherein instructions to analyze the sandbox environment to identify the set of communication links comprise instructions to conduct static analysis of code and environmental variables present in the sandbox environment.

20. The computer system of claim 15, wherein instructions to analyze the sandbox environment to identify the set of communication links comprise instructions to analyze Domain Name Service (DNS) queries corresponding to the sandbox environment.

* * * * *